United States Patent
Auner et al.

(10) Patent No.: US 9,617,391 B2
(45) Date of Patent: *Apr. 11, 2017

(54) HALOGENATED POLYSILANE AND THERMAL PROCESS FOR PRODUCING THE SAME

(75) Inventors: Norbert Auner, Glashuetten (DE); Sven Holl, Gueckigen (DE); Christian Bauch, Bitterfeld-Wolfen (DE); Gerd Lippold, Leipzig (DE); Rumen Deltschew, Leipzig (DE); Seyed-Javad Mohsseni-Ala, Bitterfeld-Wolfen (DE)

(73) Assignee: Nagarjuna Fertilizers and Chemicals Limited, Hyderabad (IN)

( * ) Notice: Subject to any disclaimer, the term of this patent is extended or adjusted under 35 U.S.C. 154(b) by 458 days.

This patent is subject to a terminal disclaimer.

(21) Appl. No.: 12/995,174

(22) PCT Filed: May 27, 2009

(86) PCT No.: PCT/DE2009/000727
§ 371 (c)(1),
(2), (4) Date: Mar. 23, 2011

(87) PCT Pub. No.: WO2009/143824
PCT Pub. Date: Dec. 3, 2009

(65) Prior Publication Data
US 2011/0284796 A1    Nov. 24, 2011

(30) Foreign Application Priority Data
May 27, 2008 (DE) .................. 10 2008 025 260

(51) Int. Cl.
C09K 3/00        (2006.01)
C08G 77/60      (2006.01)

(52) U.S. Cl.
CPC .................. *C08G 77/60* (2013.01)

(58) Field of Classification Search
CPC .................. C09K 3/00; C08G 77/60
USPC .................. 423/342; 252/182.32
See application file for complete search history.

(56) References Cited

U.S. PATENT DOCUMENTS

| | | | |
|---|---|---|---|
| 2,840,588 A * | 6/1958 | Pease | 528/18 |
| 4,070,444 A | 1/1978 | Ingle | |
| 4,138,509 A | 2/1979 | Ingle et al. | |
| 4,374,182 A | 2/1983 | Gaul et al. | |
| 5,202,115 A * | 4/1993 | Vincenti et al. | 424/66 |
| 2005/0142046 A1 | 6/2005 | Todd | |
| 2007/0078252 A1 | 4/2007 | Dioumaev | |
| 2009/0127093 A1* | 5/2009 | Auner | 204/157.44 |
| 2009/0169457 A1* | 7/2009 | Auner | C01B 33/027 423/342 |
| 2010/0004385 A1 | 1/2010 | Auner et al. | |
| 2012/0145533 A1 | 6/2012 | Auner | |

FOREIGN PATENT DOCUMENTS

| | | | | |
|---|---|---|---|---|
| DE | 955414 | | 1/1957 | |
| DE | 3126240 | | 5/1982 | |
| DE | 10059625 | | 5/2002 | |
| DE | 102005024041 | | 11/2006 | |
| DE | 102006034061 | | 1/2008 | |
| DE | WO 2008009473 | A1 * | 1/2008 | .......... C01B 33/027 |
| EP | 1016667 | B1 | 4/2004 | |
| FI | 82232 | | 9/1990 | |
| GB | 702 349 | | 1/1954 | |
| GB | 702349 | A | 1/1954 | |
| JP | 59001505 | A | 1/1984 | |
| JP | 59162121 | A | 9/1984 | |
| JP | 59182222 | A | 10/1984 | |
| JP | 62070425 | A | 3/1987 | |
| JP | 63089414 | A | 4/1988 | |
| JP | 64-085223 | A | 3/1989 | |
| JP | 2008542162 | A | 11/2008 | |
| JP | 2010-521393 | A | 6/2010 | |
| SU | 435190 | A1 | 7/1974 | |
| WO | WO 81/03168 | | 11/1981 | |
| WO | 2006125425 | A1 | 11/2006 | |
| WO | 2008009473 | A1 | 1/2008 | |
| WO | WO 2008009473 | A1 * | 1/2008 | |
| WO | WO 2008/031427 | | 3/2008 | |
| WO | WO 2008/051328 | | 5/2008 | |
| WO | 2008-110386 | A1 | 9/2008 | |
| WO | 2009143823 | A2 | 12/2009 | |

OTHER PUBLICATIONS

Schmeisser and K. Friederich Silicon Diiodide [SiI2]x Angew. Chem. internat. Edit / vol. 3 (1964)/No. 10 p. 699 Published in 1964.*
G. Fritz et al., "Gewinnung ringformiger chlorierter Silicium-methylen-Verbindungen (Cyclocarbosilane) aus CH3SiCl3, (CH3)2SiCl2 und (CH3)3SiCl", Zeitschrift fur Anorganische Und Allgemeine Chemie, Verlag Johann Ambrosius Barth, vol. 302, No. 1, pp. 60-80, Jan. 1, 1959.
U. Herzog et al., "Heterosubstituted Polysilanes", Macromolecules, vol. 32, pp. 2210-2214, 1999.
Office Action issued Dec. 6, 2013 for the Japanese counterpart application No. 2011-510823.
Uwe Herzog et al., Heterosubstituted Polysilanes, Macromolecules, 1999, 32, 2210-2214.
Kaczmarczyk A. et al.: "The preparation and some properties of a new pentasilicon dodecachloride" Si5CL 12(1 ) J. Inorganic Nucl. Chem., 1964, vol. 26, pp. 421-425.

(Continued)

*Primary Examiner* — Jessee Roe
*Assistant Examiner* — Jenny Wu
(74) *Attorney, Agent, or Firm* — VLP Law Group LLP; Kent H Cheng

(57) ABSTRACT

The present invention relates to a halogenated polysilane as a pure compound or mixture of compounds each having at least one direct Si—Si bond, whose substituents consist exclusively of halogen or of halogen and hydrogen and in whose composition the atomic ratio substituent:silicon is greater than 1:1.

11 Claims, 4 Drawing Sheets

(56) References Cited

OTHER PUBLICATIONS

Holleman et al.:"Lehrbuch der Anorganischen Chemie" 101. Auflage, 1995, S. 910 f. zur Synthese von SiCl2 und hoherer Siliciumchloride.
Fritz, G., et. al.: "Gewinnung ringformiger chlorierter Silicium-methylen-Verbindungen (Cyclocarbosilane) aus CH3SiCl3, (CH3)2SiCl2 und (CH3)3SiCl" Zeitschrift for anorganische und allgemeine Chemie, Verlag Johann Ambrosius Barth., Leipzig, DD, vol. 302, Jan. 1, 1959, pp. 60-80.
Hollemann and Wiberg: "Higher Silanes" 33rd edition of the chemistry textbook "Lehrbuch der anorganischen Chemie", 1985, Section 2.2.2., pp. 743 ff.
Rossiter et al., Physical Methods of Chemistry, vol. IIIA, Determination of Chemical Composition and Molecular Structure, Part A, $2^{nd}$ Edition (1987).
29Si NMR spectra of DE 102005024041.
Dr. Nils Wiberg, 102. Auflage, Lehrbuch der Anorganischen Chemie, p. 512 (2007).
Raman spectra of DE 102005024041.
Raman spectra of WO 2008/051328.
Falbe et al., Römpp Chemie Lexikon, Georg Thieme Verlag Stuttgart, New York vol. 9, pp. 3781-3783 (1992).
Falbe et al., Römpp Chemie Lexikon, Georg Thieme Verlag Stuttgart, New York vol. 9, pp. 4909 (1992).
Schrader Bernhard, Vibrational Spectra of molecules in different states, Infrared and Raman Spectroscopy, vol. 2.6, VCH Weinheim, p. 35 (1995).
29Si NMR spectra of WO 2008/051328.
Hengge et al., Darstellung und charakterisierung eines neuen cyclischen Siliciumchlorides $Si_4Cl_8$, Z. Anorg. Allg. Chem. 458 p. 163-167 (1979).
Kohlrausch K.W.F., Ramanspektren, Akademische Verlagsgesellschaft Becker & Erler, Leipzig, p. 28 (1943).
Schäfer et al., Über das Reaktionsgleichgewicht Si+SiCl4=2SiCl2 und die thermochemischen eigenschaften des gasformigen Silicium(II)-chlorids, Z. anorg. Allg. Chemie p. 250-264(1953).
Schenk P.W. et al., Darstellung und eigenschaften des Siliciumdichlorids (SiCl), Z. anorg. Allg. Chemie vol. 334 p. 57-65 (1964).
Schmeisser M., International Union fur Reine und angewandte Chemie, Angewandte Chemie 66, p. 713-714 (1954).
Schmeisser et al., Siliciumdijodid $(SiJ_2)_x$ Angew. Chem. 76 p. 782 (1964).
Schmeisser M. et al., Das Silicium-dibromid$[SiBr2]x$ und seine Derivate, Zeitschrift fur Naturforschung 11b (1956) p. 278-282.
Schmeisser et al., Über das Siliciumdichlorid $[SiCl_2]x$, Z. anorg. Allg. Chemie 334 pp. 50-56 (1964).
Schwarz et al., Über ein Siliziumchlorid der Formel SiCl, Z. anorg. Allg. Chemie 241, pp. 395-415 (1939).
Schwarz et al., Über ein Siliciumchlorid der Formel Si1OC122, Z. anorg. Allg. Chemie, 232, pp. 241-248 (1937).
Stüger et al., Anorganische Bi(cyclopentasilanyle): Synthese und spektroskopische Charakterisierung, Z. anorg. Allg. Chem. 621, pp. 1517-1522 (1995).
Teichmann et al., Experimentelle Untersuchung des Reaktionsgleichgewichtes Sic14(g)+Si(f)=2SiC12(g) nach der Stromungsmethode, Z. anorg. Allg. Chemie 347 pp. 145-155 (1966).
Timms et al., Silicon-Fluorine Chemistry. I. Silocon Difluoride and the Perfluorosilanes, Journal of the American Chemical Society 87, pp. 2824-2828 (1965).
Zink et al., Transoid, Ortho, and Gauche Conformers of n-Si4C110: Raman and Mid-IR Matrix-Isolation Spectra, J. Phys. Chem. A 2000, 104 pp. 3829-3841.
Adams et al., Silicon-fluorine chemistry XII. Enthalpy of formation of polydifluorosilylene and the silicon-silicon bond energy, J. Chem. Thermodynamics, 2, pp. 439-443 (1970).
Besson et al., Sur les composes bromes et hydrobromes du silicium, comptes rendus 151, pp. 1055-1057 (1911).
Hassler et al., Synthese und Eigenschaften einiger Iodtrisilane, Journal of Organometallic Chemistry, 480 pp. 173-175 (1994).
Hassler et al., The infrared and raman spectra of octachloro-and octabromocyclotetrasilane, Journal of Molecular Structure, 66 pp. 25-30 (1980).
Hengge et al., Periodierte Cyclosilane, Angewandte Chemie 93, pp. 698-701 (1981).
Hengge et al., Zur Darstellung der Schichtverbindungen (siH)n und (SiF)n, Monatshefte fur Chemie, 101 pp. 1068-1073 (1970).
Herzog et al., Heterosubstituted Polysilanes, Macromolecules 32, pp. 2210-2214 (1999).
Hofler et al., Verbesserte Darstellung und Raman-Spektrum von Oktafluortrisilan, Monatshefte fur Chemie, 107 pp. 731-735 (1976),
Hohenberg et al., Inhomogeneous Electron Gas, Physical Review 136, pp. 864-871 (1964).
Jenkins et al., Pyrolysis of Halodisilanes and the formation and insertion reactions of chlorosilylene and fluorosilylene, Inorganic Chemistry, 12 pp. 2968-2972 (1973).
Koch et al., Infrared and Raman Intensities, A Chemist's Guide to Density Functional Theory, Chapter 10.5, pp. 191-195 (2000).
Koe J. R. et al., Perchlorpolysilan: Kristallstruktur, Festkörper 29Si-NMR-spektroskopie und Reaktionen, Angew. Chemie, 110 pp. 1514-1515 (1998).
Kohn et al., Self-Consistent equations including exchange and correlation effects, Physical Review, vol. 140 No. 4A pp. A 1133-1138(1965).

\* cited by examiner

HALOGENATED POLYSILANE AND THERMAL PROCESS FOR PRODUCING THE SAME

RELATED APPLICATIONS

This is a U.S. national stage of application No. PCT/DE2009/000727, filed on May 27, 2009.

This application claims the priority of German application no. 10 2008 025 260.3 filed May 27, 2008, the entire content of which is hereby incorporated by reference.

BACKGROUND OF THE INVENTION

The present invention relates to a halogenated polysilane as a pure compound or mixture of compounds each having at least one direct Si—Si bond, whose substituents consist exclusively of halogen or of halogen and hydrogen and in whose composition the atomic ratio substituent:silicon is greater than 1:1.

Such chlorinated polysilanes (PCS) are known, for example, from: DE 10 2005 024 041 A1; DE 10 2006 034 061 A1; WO 2008/031427 A2; WO 81/03168; US 2005/0142046 A1; M. Schmeisser, P. Voss "Über das Siliciumdichlorid [SiCl$_2$]$_x$" [Concerning silicon dichloride [SiCl$_2$]$_x$], Z. anorg. allg. Chem. (1964) 334, 50-56; US2007/0078252A1; DE 31 26 240 C2; GB 702,349; R. Schwarz and H. Meckbach "Über ein Siliciumchlorid der Formel Si$_{10}$Cl$_{22}$" [Concerning a silicon chloride of the formula Si$_{10}$Cl$_{22}$], Z. anorg. allg. Chem. (1937) 232, 241-248. They can be prepared, on the one hand, by means of a purely thermal reaction, such as described, for example, in M. Schmeisser, P. Voss "Über das Siliciumdichlorid [SiCl$_2$]$_x$", Z. anorg. allg. Chem. (1964) 334, 50-56 (Schmeisser 1964), by heating vaporous halosilanes with a reducing agent (Si, H$_2$) to relatively high temperatures (>700° C.). The halogenated polysilanes obtained are slightly greenish yellow-colored, glassy and highly polymeric. Furthermore, the literature mixture is strongly contaminated with AlCl$_3$ due to the preparation.

In R. Schwarz and H. Meckbach "Über ein Siliciumchlorid der Formel Si$_{10}$Cl$_{22}$", Z. anorg. allg. Chem. (1937) 232, 241-248, a silicon chloride having the composition Si$_{10}$Cl$_{22}$ is further presented, which was obtained by reaction of SiCl$_4$ with silicon carbide at 1050° C. The authors describe it as a highly viscous oil with a molar mass of 1060 g/mol.

Similar results are described by P. W. Schenk and Helmuth Eloching "Darstellung und Eigenschaften des Siliciumdichlorids (SiCl$_2$)$_x$ [Preparation and properties of silicon dichloride (SiCl$_2$)$_x$]", Z. anorg. allg. Chem. (1964) 334, 57-65, who obtain products with molar masses of 1250 (Si$_{12}$Cl$_{24}$) to 1580 (Si$_{16}$Cl$_{32}$) g/mol as colorless to yellow, viscous to resin-like, cyclic substances.

In R. Schwarz and U. Gregor "Über ein Siliciumchlorid der Formel SiCl" [Concerning a silicon chloride of the formula SiCl], Z. anorg. allg. Chem. (1939) 241, 395-415 a PCS of the composition SiCl is reported. This is completely insoluble.

In J. R. Koe, D. R. Powell, J. J. Buffy, S. Hayase, R. West, Angew. Chem. 1998, 110, 1514-1515, a PCS (cream-white solid) is described, which is formed by ring-opening polymerization of Si$_4$Cl$_8$ and is insoluble in all customary solvents.

In Harald Schafer and Julius Nickl "Über das Reaktionsgleichgewicht Si+SiCl$_4$=2SiCl$_2$ und die thermo-chemischen Eigenschaften des gasformigen Silicium(II)-chlorids" [Concerning the reaction equilibrium Si+SiCl$_4$=2SiCl$_2$ and the thermochemical properties of gaseous silicon (II) chloride], Z. anorg. allg. Chem. (1953) 274, 250-264 and in R. Teichmann and E. Wolf "Experimentelle Untersuchung des Reaktions-gleichgewichtes SiCl$_4$(g)+Si(f)=2SiCl$_2$(g) nach der Strömungsmethode", [Experimental investigation of the reaction equilibrium SiCl$_4$(g)+Si(f)=2SiCl$_2$(g) according to the flow method], Z. anorg. allg. Chem. (1966) 347, 145-155, thermodynamic investigations on the reaction of SiCl$_4$ with Si are carried out. PCS is not isolated or described here.

In GB 702,349, the reaction of chlorine gas with calcium silicide in a fluidized bed at most 250° C. to give lower perchlorooligosilanes is described. The mixtures formed here are unbranched on account of the low temperature, contain no cyclic PCS and consist of about 80% Si$_2$Cl$_6$ and Si$_3$Cl$_8$ in addition to 11% Si$_4$Cl$_{10}$ and small amounts of Si$_5$Cl$_{12}$ and Si$_6$Cl$_{14}$. The mixtures of these compounds are colorless liquids, contain no cycles and are contaminated by CaCl$_2$ due to the process.

DE 31 26 240 C2 describes the wet-chemical preparation of PCS from Si$_2$Cl$_6$ by reaction with a catalyst. The mixtures obtained still contain the catalyst and are therefore washed with organic solvents, whereby traces of the reactants, the solvents and the catalyst remain. Moreover, these PCSs contain no cyclic compounds.

Further wet-chemical processes are presented in US2007/0078252A1:
1. Halogenated aryloligosilanes to be reduced with sodium and subsequently to be cleaved with HCl/AlCl$_3$ aromatics.
2. Transition metal-catalyzed dehydrogenating polymerization of arylated H-silanes and subsequent dearylation with HCl/AlCl$_3$.
3. Anionically catalyzed ring-opening polymerization (ROP) of (SiCl$_2$)$_5$ with TBAF (Bu$_4$NF).
4. ROP of (SiAr$_2$)$_5$ with TBAF or Ph$_3$SiK and subsequent dearylation with HCl/AlCl$_3$.

In all these methods, PCSs contaminated with solvent/catalyst are in turn obtained, of which only the distillable fractions can be effectively purified. No product mixture of high purity can therefore be obtained from the above reactions.

It is further known to prepare such halogenated polysilanes via a plasma-chemical process. For example, DE 10 2005 024 041 A1 relates to a process for the preparation of silicon from halosilanes, in which the halosilane is reacted in a first step with generation of a plasma discharge to give a halogenated polysilane, which is subsequently decomposed in a second step with heating to give silicon. This known process is carried out at high energy densities (>10 Wcm$^{-3}$) with respect to plasma generation, the end product being a not very compact waxy-white to yellow-brownish or brown solid. Spectroscopic investigations have shown that the final product obtained has a relatively large degree of cross-linking. The high energy densities used lead to products of high molar masses, wherefrom insolubility and low fusibility result. Moreover, this PCS also has a significant hydrogen content.

Furthermore, a high-pressure plasma process for the synthesis of HSiCl$_3$ is described in WO 81/03168, in which PCSs are obtained as minor by-products. Since these PCSs are obtained under hydrogenating conditions (HSiCl$_3$ synthesis!), they have a significant hydrogen content.

In US 2005/0142046 A1, a PCS preparation by silent electric discharge in SiCl$_4$ at normal pressure is described. In this process, only short-chain oligosilanes result, as the author shows by example of the selective reaction of SiH$_4$ to give Si$_2$H$_6$ and Si$_3$H$_8$ by connecting several reactors one after the other.

The behavior is analogous in DE 10 2006 034 061 A1, where a similar reaction is described in which gaseous and liquid PCSs are obtained with $Si_2Cl_6$ as the main constituent (p. 3, [0016]). Although the authors describe that the molar masses of the PCSs can be increased by use of several reactors connected one after the other, only material can be obtained here that can be brought into the gas phase undecomposed. The authors also express this situation in the claims, in which they provide for distillations for all PCS mixtures obtained. Furthermore, the PCSs mentioned in DE 10 2006 034 061 A1 are hydrogen-containing.

Besides chlorinated polysilanes, further halogenated polysilanes $Si_xH_y$ (X=F, Br, I) are also known in the prior art.

According to F. Höfler, R. Jannach, Monatshefte für Chemie 107 (1976) 731-735, $Si_3F_8$ can be prepared from $Si_3(OMe)_8$ with $BF_3$ in a closed tube at −50 to −60° C. (8 h) in yields of 55-60%. The methoxyisotetrasilane is completely degraded to shorter perfluorosilanes under these conditions.

E. Hengge, G. Olbrich, Monatshefte für Chemie 101 (1970) 1068-1073 describes the preparation of a 2-dimensionally built polymer $(SiF)_x$. The 2-dimensionally constructed polymers $(SiCl)_x$ and $(SiBr)_x$ are obtained from $CaSi_2$ by reaction with ICl or IBr. A halogen exchange is then completed with $SbF_3$. However, partial degradation of the Si layer structure occurs here. The resulting product contains the amount of $CaCl_2$ specified stoichiometrically from CaSi, which cannot be washed out.

The preparation of polyfluorosilane $(SiF_2)_x$ is described, for example, in M. Schmeisser, Angewandte Chemie 66 (1954) 713-714. $SiBr_2F_2$ reacts with magnesium in ether at room temperature to give a yellow, highly polymeric $(SiF_2)_x$. Compounds such as $Si_{10}Cl_{22}$, $(SiBr)_x$ and $Si_{10}Br_{16}$ can be transhalogenated with $ZnF_2$ to give the corresponding fluorides.

R. L. Jenkins, A. J. Vanderwielen, S. P. Ruis, S. R. Gird, M. A. Ring, Inorganic Chemistry 12 (1973) 2968-2972 report that $Si_2F_6$ decomposes at 405° C. to give $SiF_4$ and $SiF_2$. By condensation of this intermediate, $(SiF_2)_x$ can be obtained.

The standard method for the production of $(SiF_2)_x$ is illustrated, for example, in P. L. Timms, R. A. Kent, T. C. Ehlert, J. L. Margrave, Journal of the American Chemical Society 87 (1965) 2824-2828. Here, $(SiF_2)_x$ is produced by passing $SiF_4$ over silicon at 1150° C. and 0.1-0.2 torr and freezing out the resulting $SiF_2$ at −196° C. with polymerization during the subsequent thawing. The colorless to slightly yellow plastic polymer melts on warming to 200-350° C. in vacuo and releases perfluorinated silanes from $SiF_4$ to at least $Si_{14}F_{30}$. A silicon-rich polymer $(SiF)_x$ remains, which decomposes vigorously at 400±10° C. to give $SiF_4$ and Si. The lower perfluoropolysilanes are colorless liquids or crystalline solids that are isolable by fractional condensation in purities of >95%. Traces of secondary or tertiary amines catalyze the polymerization of the perfluorooligosilanes. U.S. Pat. No. 2,840,588 discloses that $SiF_2$ is formed at <50 torr and >1100° C. from $SiF_4$ and Si, SiC, silicon alloys or metal silicides. For the isolation of $(SiF_2)_x$, the intermediate must be cooled rapidly to <0° C. G. P. Adams, K. G. Sharp, P. W. Wilson, J. L. Margrave, Journal of Chemical Thermodynamics 2 (1970) 439-443 describe that $(SiF_2)_x$ is prepared from $SiF_4$ and Si at 1250° C. In a similar manner, according to U.S. Pat. No. 4,070,444 A $(SiF_2)_x$ is prepared by reaction of a perfluorosilane with metallurgical silicon and subsequent deposition of the $SiF_2$. Thermolysis of the polymer releases elemental silicon of higher purity than the starting material. The process disclosed in U.S. Pat. No. 4,138,509 A likewise serves for purification. Silicon that contains aluminum as an impurity is reacted with $SiF_4$ in the presence of $SiO_2$ at temperatures >1100° C. in order to produce $SiF_2$. A condensation of the product gas in two stages leads to the selective deposition of the gaseous impurities in a first fraction, while the second fraction consists of largely pure $(SiF_2)_x$. Thermal decomposition of the polymer at 100-300° C. produces gaseous and liquid perfluorinated silanes, which are then decomposed to give silicon at 400-950° C.

FI 82232 B discloses a reaction at even higher temperature. $SiF_4$ reacts with Si in an Ar plasma flame to give $SiF_2$ (0.8:1 mol, 70% $SiF_2$ content).

Short-chain perbrominated polysilanes are formed according to A. Besson, L. Fournier, Comptes rendus 151 (1911) 1055-1057. An electrical discharge in gaseous $HSiBr_3$ produces $SiBr_4$, $Si_2Br_6$, $Si_3Br_8$ and $Si_4Br_{10}$.

K. Hassler, E. Hengge, D. Kovar, Journal of molecular structure 66 (1980) 25-30 prepare cyclo-$Si_4Br_8$ by reaction of $(SiPh_2)_4$ with HBr under $AlBr_3$ catalysis. In H. Stüger, P. Lassacher, E. Hengge, Zeitschrift für allgemeine and anorganische Chemie 621 (1995) 1517-1522, $Si_5Br_9H$ is reacted by boiling with $Hg(tBu_2)$ in heptane to give the corresponding bis-cyclopenta-silane $Si_{10}Br_{18}$. Alternatively, a ring linkage of $Si_5Ph_9Br$ with naphthyllithium or K or Na/K in various solvents can take place with subsequent halogenation with $HBr/AlBr_3$.

Perbrominated polysilanes are described, for example, in M. Schmeisser, M. Schwarzmann, Zeitschrift für Naturforschung 11b (1956) 278-282. In the reaction of Mg turnings with $SiBr_4$ in boiling ether two phases are formed, the lower of which consists of magnesium bromide etherate and $(SiBr)_x$, while the upper phase contains $MgBr_2$ dissolved in ether and small amounts of lower silicon sub-bromides. $(SiBr)_x$ can be purified by washing with ether. The reaction of $SiBr_4$ vapor with Si at 1200° C. and in vacuo produces brown, brittle $(SiBr_2)_x$. The hydrolysis-sensitive substance is readily soluble in benzene and most non-polar solvents. In vacuo, the polymer decomposes from 200° C. with elimination of $Si_2Br_6$. At 350° C. $(SiBr)_x$ remains; further warming to 550-600° C. leads to elemental silicon. It is presumed on the basis of the good solubility that $(SiBr_2)_x$ consists of Si rings of restricted size. The molecular weight determination of about 3000 appears unreliable. $(SiBr_2)_x$ reacts with Mg in ether to give $(SiBr_{1.46})_x$. DE 955414 B likewise discloses a reaction at high temperature. If $SiBr_4$ or $Br_2$ vapor is passed through silicon grit in vacuo at 1000-1200° C., mainly $(SiBr_2)_x$ results in addition to some $Si_2Br_6$.

According to M. Schmeisser, Angewandte Chemie 66 (1954) 713-714, in addition to $(SiBr)_x$ also $Si_2Br_6$ and further oligosilanes such as $Si_{10}Br_{16}$ are formed by action of $SiBr_4$ on elemental Si at 1150° C.

In US 2007/0078252 A1, the ring-opening polymerization of cyclo-$Si_5Br_{10}$ and cyclo-$Si_5I_{10}$ by action of $Bu_4NF$ in THF or DME is claimed.

For example, E. Hengge, D. Kovar, Angewandte Chemie 93 (1981) 698-701 or K. Hassler, U. Katzenbeisser, Journal of organometallic chemistry 480 (1994) 173-175 report on the production of short-chain periodinated polysilanes. By reaction of the phenylcyclosilanes $(SiPh_2)_n$ (n=4–6) or of $Si_3Ph_8$ with HI under $AlI_3$ catalysis, the periodinated cyclosilanes $(SiI_2)_n$ (n=4–6) or $Si_3I_8$ result.

M. Schmeisser, K. Friederich, Angewandte Chemie 76 (1964) 782 describe various routes for the preparation of periodinated polysilanes. $(SiI_2)_x$ results in about 1% yield on passing $SiI_4$ vapor over elemental silicon at 800-900° C. in a high vacuum. The pyrolysis of $SiI_4$ under the same conditions yields the same very hydrolysis-sensitive and benzene-soluble product. On the action of a glow discharge on $SiI_4$ vapors in a high vacuum, a solid, amorphous, yellow-reddish silicon sub-iodide of the composition $(SiI_{2.2})_x$ insoluble in all customary solvents is obtained with a yield of 60 to 70% (based on $SiI_4$). The pyrolysis of this substance at 220 to 230° C. in a high vacuum leads to a dark-red $(SiI_2)_x$, simultaneously forming $SiI_4$ and $Si_2I_6$. The chemical properties of the compounds $(SiI_2)_x$ thus obtained coincide—except for the solubility in benzene. The pyrolysis of $(SiI_2)_x$ at 350° C. in a high vacuum affords $SiI_4$, $Si_2I_6$ and an orange-red, brittle solid of the composition $(SiI)_x$. $(SiI_2)_x$ reacts with chlorine or bromine between −30° C. and +25° C. to give benzene-soluble mixed silicon sub-halides such as $(SiClI)_x$ and $(SiBrI)_x$. At higher temperatures, the Si—Si chains are cleaved by chlorine or bromine with simultaneous complete substitution of the iodine. Compounds of the type $Si_nX_{2n+2}$ (n=2-6 for X=Cl, n=2-5 for X=Br) are obtained. $(SiI_2)_x$ reacts completely with iodine at 90 to 120° C. in a bomb tube to give $SiI_4$ and $Si_2I_6$.

BRIEF SUMMARY OF THE INVENTION

The present invention is based on the object of creating a halogenated polysilane of the type indicated, which is particularly readily soluble and fusible. Furthermore, a process for the preparation of such a halogenated polysilane is to be provided.

This object is achieved according to the invention with a halogenated polysilane of the type indicated in that the polysilane consists of rings and chains with a high proportion of branching sites which, based on the total product mixture, is greater than 1%, has a RAMAN molecular vibration spectrum of $I_{100}/I_{132}<1$, where $I_{100}$ denotes the Raman intensity at 100 $cm^{-1}$ and $I_{132}$ denotes the Raman intensity at 132 $cm^{-1}$, and in the $^{29}Si$ NMR spectra has its significant product signals in the chemical shift range from +23 ppm to −13 ppm, from −18 ppm to −33 ppm and from −73 ppm to −93 ppm.

The $^{29}Si$ NMR spectra were recorded on a 250 MHz apparatus of the Bruker DPX 250 type with the pulse sequence zg30 and referenced against tetramethylsilane (TMS) as the external standard $[\delta(^{29}Si)=0.0]$. The acquisition parameters here are: TD=32 k, AQ=1.652 s, D1=10 s, NS=2400, O1P=−40, SW=400.

The RAMAN molecular vibration spectra were determined with an XY 800 spectrometer from Dilor with adjustable laser excitation (T-sapphire laser, pumped by Ar ion laser) and confocal Raman and luminescence microscope, with liquid nitrogen-cooled CCD detector, measuring temperature equal to room temperature, excitation wavelengths in the visible spectral range, inter alia 514.53 nm and 750 nm.

The halogenated polysilane formed according to the invention is prepared using considerably "milder" conditions, than described, for example, in [Schmeisser 1964]. This means that the reaction is carried out at lower temperature and elevated pressure, whereby an excess of $SiX_4$ (X=halogen) is present in the gas phase, with which the $SiX_2$ formed can react with insertion into the Si—X bonds. By means of this, the degree of polymerization of the $SiX_2$ is reduced, whereby a liquid and better-soluble product results. Moreover, the conversion rate is increased, whereby a technical preparation process is obtained.

The polysilane has a slight coloration from dull-yellow to yellowish-light brown and is not glassy and highly polymeric, but oily to viscous, which shows that the degree of polymerization is considerably lower. The polysilane is a complex substance mixture with average molar masses of up to about 900 g/mol.

The degree of branching was determined by $^{29}Si$ NMR spectroscopy. It was discovered here that the halogenated polysilanes prepared using the process according to the invention have a high content of branched short-chain and cyclic compounds, their branching sites having a content in the total mixture of more than 1%. The branchings in the $^{29}Si$ NMR are seen here in a range from $\delta$=−18 to −33 ppm and $\delta$=−73 to −93 ppm. In standard $^{29}Si$ NMR spectra of the polysilanes according to the invention clear resonances are seen in these regions.

The high content of branched polysilanes is thus related to the fact that the latter are thermodynamically more favorable than halogenated polysilanes having unbranched chains and therefore preferably result in the thermal reaction that proceeds near to the thermodynamic equilibrium. The content of cyclosilanes was also determined by $^{29}Si$ NMR spectroscopy and additionally by RAMAN spectroscopy (see below), where it was seen that a relatively high content of cyclic molecules is present.

The halogenated polysilanes formed according to the invention further have a RAMAN molecular vibration spectrum of $I_{100}/I_{132}<1$. In particular, weak Raman signals in the range from 95-110 $cm^{-1}$ occur in the low frequency range, while in the range 120-135 $cm^{-1}$ significantly stronger Raman intensities were measured.

For explanation of this, attention may be called to the following. Theoretical quantum mechanical calculations for cyclic halogenated polysilanes show, inter alia, intensive characteristic vibration modes of between 120 $cm^{-1}$ and 135 $cm^{-1}$. Such calculations for linear halogenated polysilanes, however, show no distinctive modes in this range. The lowest frequency, intensive modes of the linear compounds, however, shift with increasing chain lengths to smaller wavelengths. In the mixture of halogenated polysilanes, they appear as RAMAN bands between 95 and 110 $cm^{-1}$. In this way, a conclusion about the content of cyclic and linear molecules can be made from the $I_{100}/I_{132}$ criterion.

The halogenated polysilane according to the invention is further distinguished in that it is completely soluble in many inert solvents, such that it can easily be removed from a reactor used for the preparation.

The halogenated polysilane formed according to the invention can in particular be dissolved readily in inert solvents, such as $SiCl_4$, benzene, toluene, paraffin etc, namely both at room temperature and also in cold and warm or boiling solvents. This is in contrast to the halogenated polysilane prepared according to the publication mentioned above (DE 10 2005 024 041 A1), that is not soluble at all in such solvents or can only be dissolved to a small extent.

The halogenated polysilane is preferably characterized in that its substituents consist exclusively of halogen.

The halogenated polysilane formed according to the invention preferably has a high content of branched chains and rings. It is oily to viscous without exception.

The halogenated polysilane according to the invention is intrinsically clean on use of correspondingly pure starting materials and consists only of Si and X (X=halogen).

To a considerable extent, the halogenated polysilanes according to the invention are further not volatile even under vacuum and decompose if it is attempted to distil them.

The halogenated polysilane formed according to one embodiment of the invention further differs compared to the plasma-chemically prepared polysilane of the said prior art (DE 10 2005 024 041 A1) in that the polysilane crude mixture prepared has a lower average chain length of n=3–9.

Finally, the plasma-chemically prepared halogenated polysilane of the prior art has a higher melting temperature than the halogenated polysilane according to the invention.

A further distinguishing criterion compared to the prior art (DE 10 2005 024 041 A1; DE 10 2006 034 061 A1; WO 2008/031427 A2; WO 81/03168) consists in the fact that the halogenated polysilane according to the invention contains no hydrogen substituents.

The polysilane according to the invention is further highly pure with respect to catalyst and solvent contamination on account of its preparation in a high temperature symproportionation process, which is a further distinguishing feature to the wet-chemical process for the preparation of polysilanes, since in the latter process traces of solvents and metal salt-like reagents always remain in the product.

The invention relates in particular to a chlorinated polysilane.

The abovementioned object is further achieved by a process for the preparation of halogenated polysilane of the type described above by reacting halosilane with silicon at high temperatures, which is characterized in that the reaction is carried out with an excess of halosilane with respect to the dihalosilylene ($SiX_2$) formed in the reactor. This can take place, for example, by adjusting the retention time of the halosilane in a silicon packed bed used to the grain size of the silicon used.

The working pressure compared to the prior art (smaller than $10^{-3}$ hPa, Schmeisser 1964) is further preferably significantly increased (0.1-1000 hPa) in order to increase the probability of active collisions of the $SiX_2$ formed with $SiX_4$ in the gas phase, whereby polymerization of the $SiX_2$ formed by wall reactions is suppressed. By means of this measure on the one hand the formation of a highly polymeric, glassy, slightly green-yellow solid described in the literature (Schmeisser 1964) is suppressed and on the other hand the conversion rate to the polysilanes according to the invention is significantly increased (greater than 4 times) compared to the prior art. A further differentiating feature is the lower average molar mass of the polysilanes of 300-900 g/mol compared to 1600-1700 g/mol in Schmeisser 1964.

As far as the temperature of the reactor in which the process according to the invention is carried out is concerned, the reactor parts on which the halogenated polysilane is deposited are preferably kept at a temperature of −70° C. to 300° C., in particular −20° C. to 280° C. Generally, the temperature of the deposition zone is kept relatively low in order to avoid the formation of Si.

Using the process according to the invention, molecular mixtures with average molar masses of 300-900 g/mol can be prepared.

A particularly preferred halogenated polysilane according to the invention are the perchloro-polysilanes (PCS).

For the process according to the invention, all energy sources that can bring the reactor to the necessary reaction temperatures, for example electrical resistance heating, gas burners or solar furnaces (concave mirror), can be used for carrying out the reaction. Electrical resistance heating is preferably used, since a very accurate temperature control is possible with this.

A halosilane is used as a starting substance for the process according to the invention. A halosilane within the meaning of the process according to the invention is designated as compounds of the type $SiX_4$ (X=F, Cl, Br, I) and their mixtures, it also being possible to employ halosilanes with mixed halogen substitution.

The gas mixture (halosilane(s)) used in the process according to the invention can additionally be diluted by an inert gas and/or contain admixtures which favor product formation. The admixture of inert gases, however, is not compulsory in the process according to the invention.

In the process according to the invention, fluorosilanes or chlorosilanes are preferably employed as the halosilane. A particularly preferred starting compound is $SiCl_4$.

The halogenated polysilane according to the invention can also contain halogen substituents from several different halogens.

In the process according to the invention, halosilanes with mixed halogen substitution can also be employed.

DETAILED DESCRIPTION OF THE INVENTION

Working Example 1

210 g of $SiCl_4$ are led in vapor form into an evacuated quartz glass tube, which is conducted at a gradient of about 30° through a furnace, and the $SiCl_4$ vapor is led through a 20 cm long silicon packed bed heated to 1200° C., the process pressure being kept at about 1 hPa. After leaving the heated zone, the product mixture is condensed on the quartz glass walls cooled to 20° C. and mostly drains into a receiver flask cooled to −196° C. After 6 h, the viscous red-brown product is removed from the reactor by dissolving in a little $SiCl_4$ and filtered. After removing the $SiCl_4$ in vacuo, about 80 g of chlorinated polysilane remain in the form of a red-brown viscous liquid.

Figure 1:
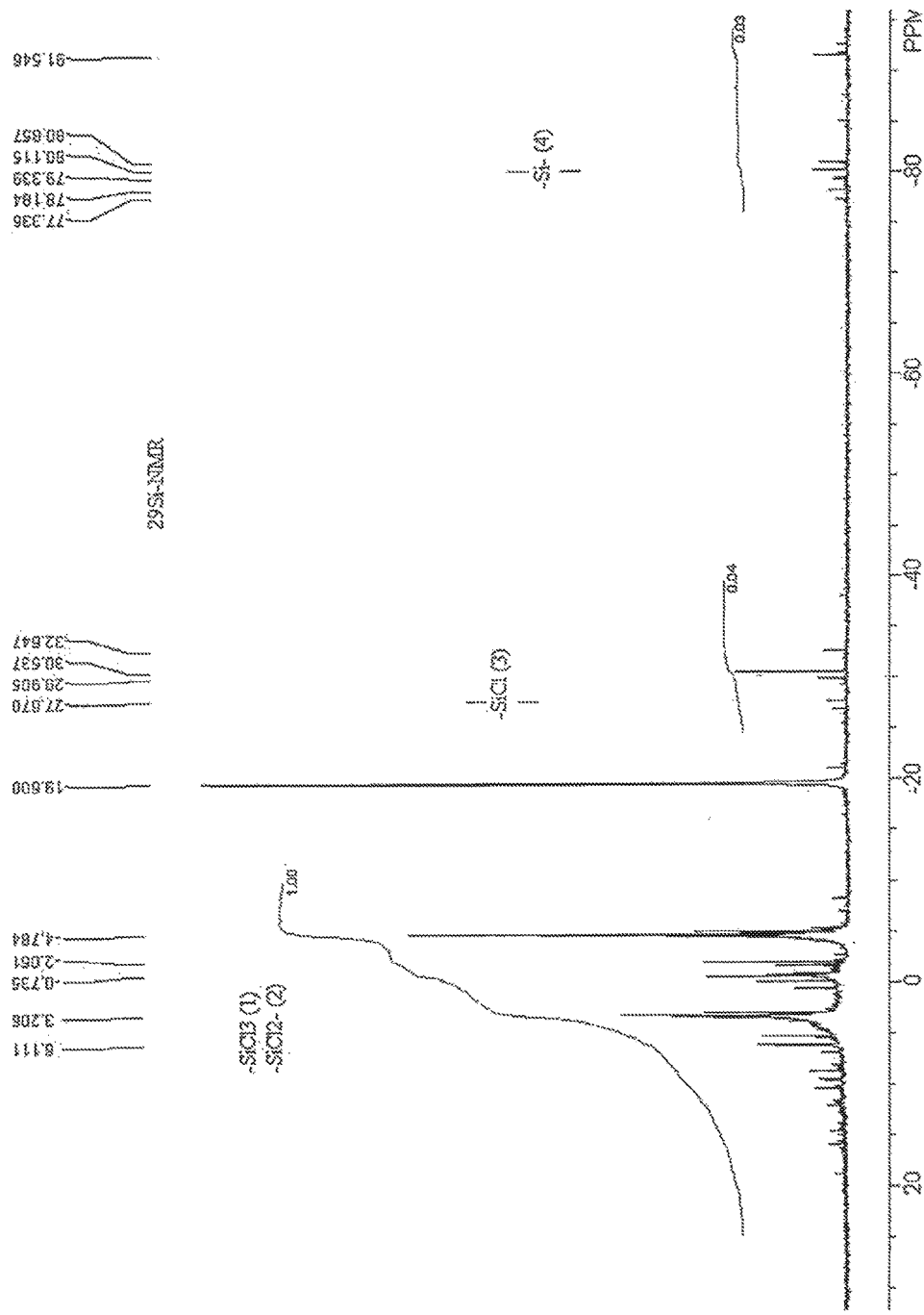
FIG. 1 shows the $^{29}Si$ NMR spectra of a chlorinated polysilane made by Example 1.

The typical $^{29}Si$ NMR shifts and the high content of various, short-chain branched compounds, e.g. decachloroisotetrasilane (inter alia δ=−32 ppm), dodecachloroneopentasilane (inter alia δ=−80 ppm) (these signals occur in the shift region at (3), which is typical for signals of SiCl groups (tertiary Si atoms), and (4), which is typical for signals of Si groups with exclusively Si substituents (quaternary Si atoms)), are apparent on the basis of the following spectrum (FIG. 1). By integration of the $^{29}Si$ NMR spectra, it is seen that the content of silicon atoms that form said branching sites (tertiary and quaternary Si atoms) of the short-chain fraction, based on the total product mixture, is 1.8 mass % and is thus >1 mass. The chemical shifts in the $^{29}Si$ NMR spectra at +23 ppm to −13 ppm ((1) and (2)) show signals of $SiCl_3$ (end groups) and $SiCl_2$ groups (unbranched chain or cycle sections), the signals in the range from −18 ppm to −33 ppm ((3)) show signals of SiCl groups and of the solvent $SiCl_4$ (about −19.6 ppm), as they are present, for example, in decachloroisotetrasilane, and the signals in the range from −73 ppm to −93 ppm are to be attributed to quaternary Si atoms of the chlorinated polysilanes, as they are present, for example, in dodecachloroneopentasilane. The average molar mass is determined by cryoscopy to be about 973 g/mol, which corresponds to the chlorinated polysilane $(SiCl_2)_n$ or $Si_nCl_{2n+2}$ obtained having an average chain length of about n=10 for $(SiCl_2)_n$ or about n=9 for $Si_nCl_{2n+2}$. The ratio of Si to Cl in the product mixture is determined after decomposition by chloride titration according to MOHR to be Si:Cl=1: 2.1 (corresponds to the empirical (analytical) formula $SiCl_{2.1}$). The signal at about −19.6 ppm originates from the solvent tetrachlorosilane. Low molecular weight cyclosilanes can be detected in the mixtures by RAMAN spectroscopy by means of intensive bands in the region of 132 cm$^{-1}$. Indications of the presence of cyclosilanes are also found in the $^{29}$Si NMR spectra by the signals at δ=−1.6 ppm $(Si_5Cl_{10})$ and δ=−2.7 ppm $(Si_6Cl_{12})$.

Figure 2:
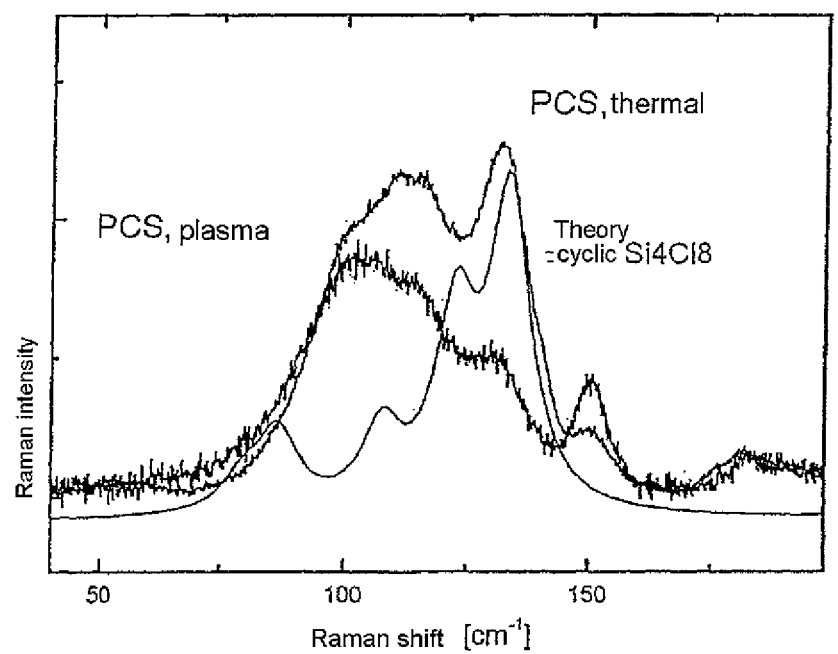
FIG. 2 shows a Raman molecular vibration spectrum of a chlorinated polysilane.

A typical RAMAN molecular vibration spectrum of the chlorinated polysilane is shown below (FIG. 2). The spectrum has a ratio $I_{100}/I_{132}$ of <1, i.e., the Raman intensity at 132 cm$^{-1}$ ($I_{132}$) is clearly higher than that at 100 cm$^{-1}$ ($I_{100}$). For comparison, the spectrum of a plasma-chemically produced polysilane mixture and the calculated spectrum of cyclic tetrasilane (octachlorocyclotetrasilane, $Si_4Cl_8$) are shown, where in the case of the plasma-chemically produced polysilane mixture the ratio changes to $I_{100}/I_{132}$>1.

This chart also shows by way of example the section of a theoretical curve (red). Here, the quantum chemically-calculated modes [Hohenberg P, Kohn W, 1964. Phys. Rev. B136:864-71; Kohn W, Sham L J. 1965. Phys. Rev. A 140:1133-38, W. Koch and M. C. Holthausen, A Chemist's Guide to Density Functional Theory, Wiley, Weinheim, 2nd edn., 2000] are fitted using a multi-Lorentz peak function, which simulates, for example, the experimental spectral resolution. With respect to the absolute intensity, the theoretical curve was standardized such that it fitted well into the chart for illustration. The relative intensities of the peaks in theory originate directly from the first principle calculation. It should thus be shown that certain intensities are typical of cyclic oligosilanes.

Working Example 2

Figure 3:
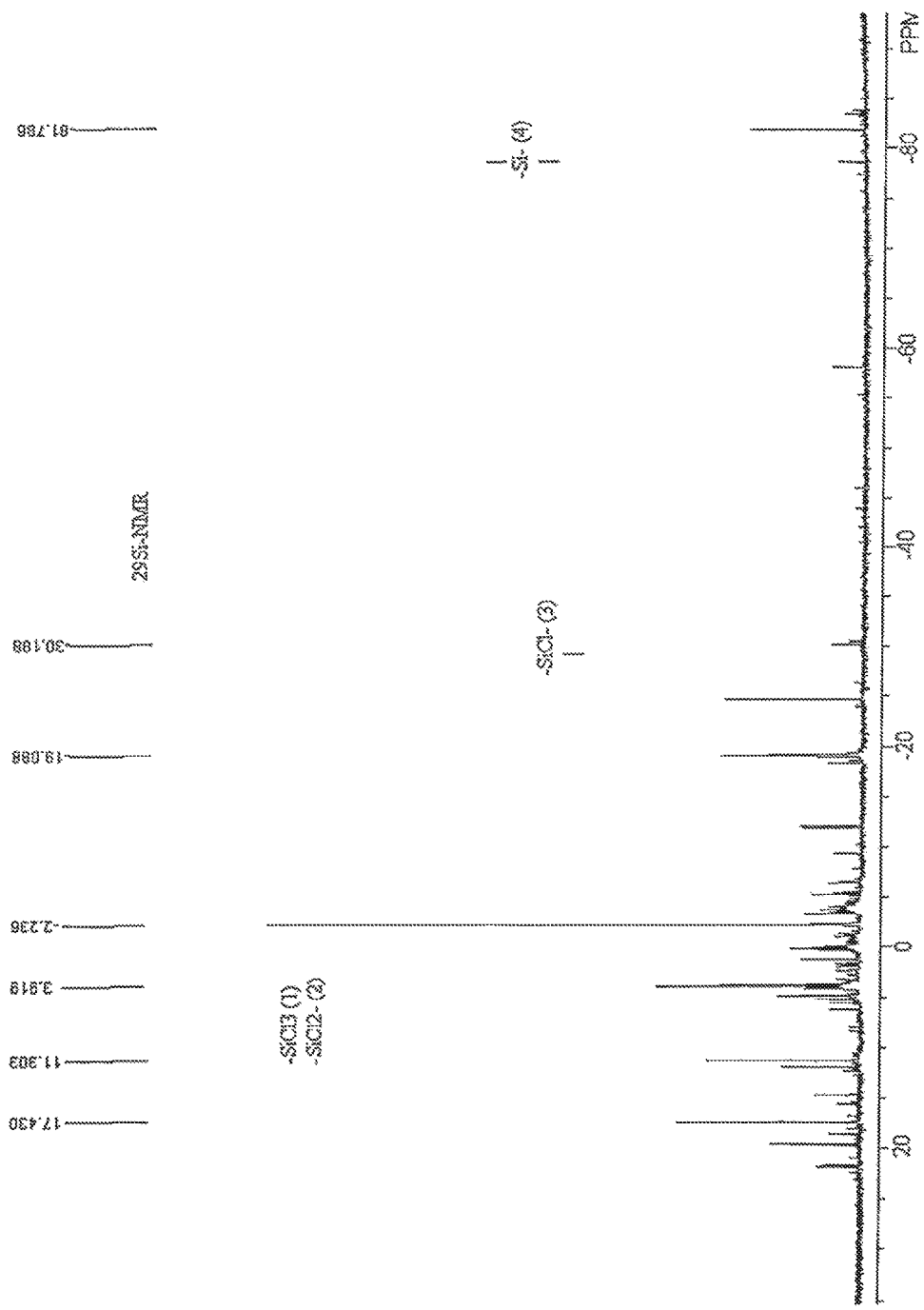
FIG. 3 shows the $^{29}Si$ NMR spectra of a chlorinated polysilane made by Example 2.

158 g of $SiCl_4$ are led in vapor form into an evacuated quartz glass tube, which is conducted at a gradient of about 30° through a furnace, and the $SiCl_4$ vapor is led through a 10 cm long silicon packed bed heated to 1200° C., the process pressure being kept at about 5 hPa. After leaving the heated zone, the product mixture is condensed on the cooled quartz glass walls and partly drains into a cooled receiver flask. After 3 hours, the viscous yellow-brownish product is removed from the reactor by dissolving in a little $SiCl_4$ and filtered. After removing the $SiCl_4$ in vacuo, 27 g of chlorinated polysilane remain in the form of a slightly yellow viscous liquid. The typical $^{29}$Si NMR shifts and the high content of various, short-chain branched compounds, e.g. decachloroisotetrasilane (inter alia δ=−32 ppm), dodecachloroneopentasilane (inter alia δ=−80 ppm) (these signals occur in the shift range at (3), which is typical for signals of SiCl groups (tertiary Si atoms), and (4), which is typical for signals of Si groups with exclusively Si substituents (quaternary Si atoms)), are apparent with the aid of the following spectrum (FIG. 3). By integration of the $^{29}$Si NMR spectra, it is seen that the content of silicon atoms that form said branching sites (tertiary and quaternary Si atoms) of the short-chain fraction, based on the total product mixture, is 2.1 mass % and is thus greater than 1 mass %. The chemical shifts in the $^{29}$Si NMR spectra at +23 ppm to −13 ppm ((1) and (2)) show signals of $SiCl_3$ (end groups) and $SiCl_2$ groups (unbranched chain or cycle sections), the signals in the range from −18 ppm to −33 ppm ((3)) show signals of SiCl groups and of the solvent $SiCl_4$ (about −19.6 ppm), as they are present, for example, in decachloroisotetrasilane, and the signals in the range from −73 ppm to −93 ppm are to be attributed to quaternary Si atoms of the chlorinated polysilanes, as they are present, for example, in dodecachloroneopentasilane.

After removal of readily volatile oligosilanes in vacuo, the average molar mass is determined by cryoscopy to be about 795 g/mol, which corresponds for the chlorinated polysilane $(SiCl_2)_n$ or $Si_nCl_{2n+2}$ to an average chain length of about n=8 for $(SiCl_2)_n$ or about n=7 for $Si_nCl_{2n+2}$. The ratio of Si to Cl in the product mixture is determined after decomposition by chloride titration according to MOHR to be Si:Cl=1:2 (corresponds to the empirical (analytical) formula $SiCl_2$). The signal at about −19.6 ppm originates from the solvent tetrachlorosilane. Low molecular weight cyclosilanes could be detected in the mixtures by RAMAN spectroscopy by means of intensive bands in the region of 132 cm$^{-1}$. The signals at δ=−1.6 ppm $(Si_5Cl_{10})$ and δ=−2.7 ppm $(Si_6Cl_{12})$ show the presence of cyclosilanes in the $^{29}$Si NMR spectra.

Working Example 3

125 g of $SiCl_4$ are added dropwise to a quartz glass tube, which is conducted at a gradient of about 30° through a furnace, evaporated and the $SiCl_4$ vapor is led through a 10 cm long silicon packed bed heated to 1200° C., the process pressure being kept constant at about 1013 hPa. After leaving the heated zone, the product gas mixture is condensed on the quartz glass walls cooled to 20° C. and mostly drains into a receiver flask cooled to 0° C. After 4 h 30 min, the brownish product is removed from the reactor by dissolving in a little $SiCl_4$ and filtered. After removing the $SiCl_4$ in vacuo, 10 g of chlorinated polysilane remain in the form of a slightly yellow oily liquid.

Figure 4:
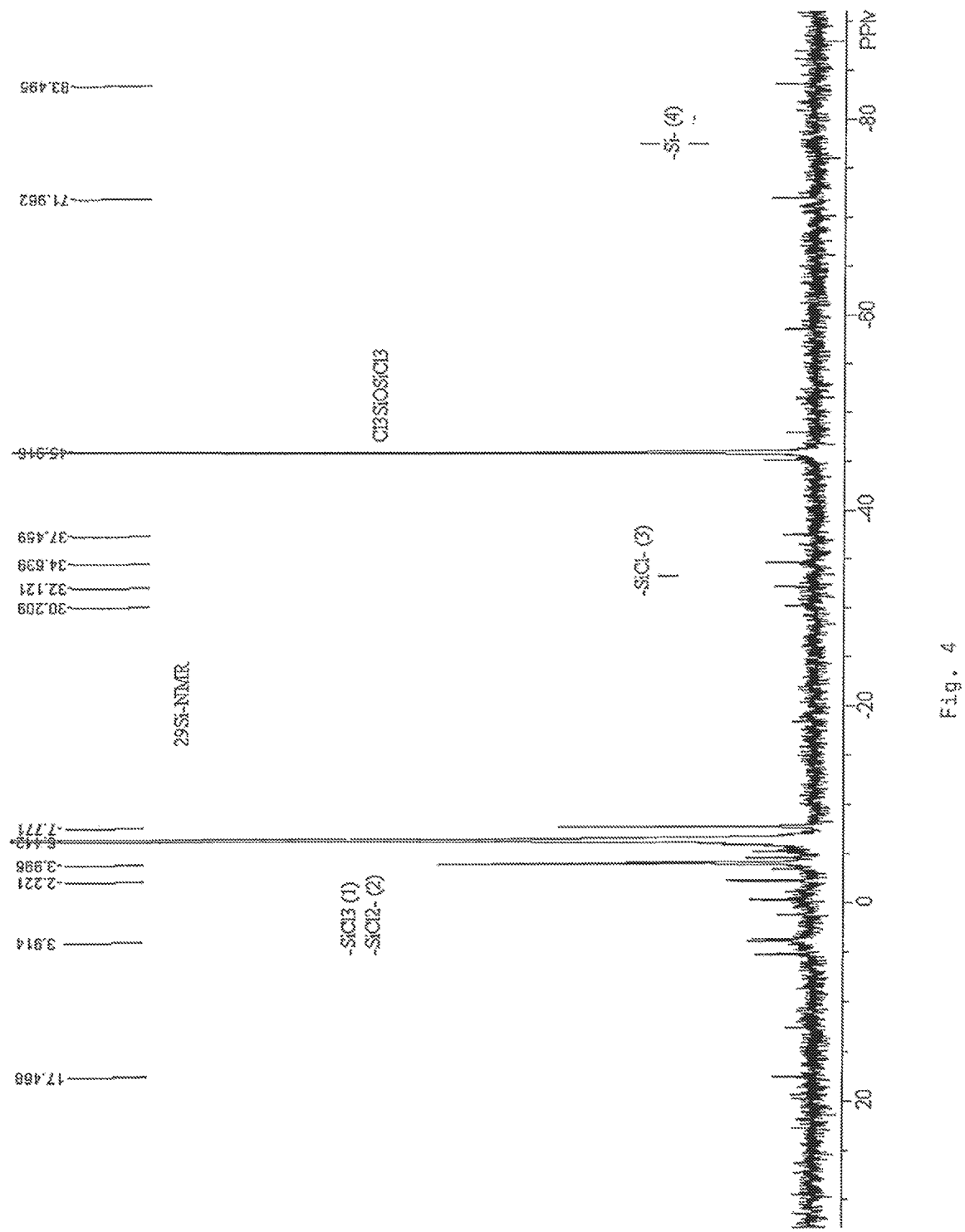
FIG. 4 shows the $^{29}Si$ NMR spectra of a chlorinated polysilane made by Example 3.

The typical $^{29}$Si NMR shifts and the content of various, short-chain branched compounds, e.g. decachloroisotetrasilane (inter alia δ=−32 ppm), dodecachloroneopentasilane (inter alia δ=−80 ppm) (these signals occur in the shift region at (3), which is typical for signals of SiCl groups (tertiary Si atoms), and (4), which is typical for signals of Si groups with exclusively Si substituents (quaternary Si atoms)), are apparent on the basis of the following spectrum (FIG. 4). By integration of the $^{29}$Si NMR spectra, it is seen that the content of silicon atoms that form said branching sites (tertiary and quaternary Si atoms) of the short-chain fraction, based on the total product mixture, is 1.1 mass % and is thus greater than 1 mass %. The chemical shifts in the $^{29}$Si NMR spectrum at +23 ppm to −13 ppm ((1) and (2)) show signals of $SiCl_3$ (end groups) and $SiCl_2$ groups (unbranched chain or cycle sections), the signals in the range from −18 ppm to −33 ppm ((3)) show signals of SiCl groups, as they are present, for example, in decachloroisotetrasilane, and the signals in the range from −73 ppm to −93 ppm are to be attributed to quaternary Si atoms of the chlorinated polysilanes, as they are present, for example, in dodecachloroneopentasilane.

The average molar mass is determined by cryoscopy to be about 315 g/mol, which corresponds for the chlorinated polysilane $(SiCl_2)_n$ or $Si_nCl_{2n+2}$ to an average chain length of about n=3.2 for $(SiCl_2)_n$ or about n=2.4 for $Si_nCl_{2n+2}$. The ratio of Si to Cl in the product mixture is determined after decomposition by chloride titration according to MOHR to be Si:Cl=1:2.8 (corresponds to the empirical (analytical) formula $SiCl_{2.8}$). The signal in the $^{29}$Si NMR spectrum at about −46 ppm originates from the solvent hexachloro-disiloxane.

The invention claimed is:

1. A composition comprising a chlorinated polysilane having at least one direct Si—Si bond, whose substituents consist of chlorine and hydrogen or consist of chlorine and in whose composition the atomic ratio of substituent:silicon is at least 1:1, wherein the polysilane consists of rings and chains with a proportion of branching sites which, based on the total composition, is >1 mass %, the polysilane has a RAMAN molecular vibration spectrum of $I_{100}/I_{132}<I$, where $I_{100}$ denotes the Raman intensity at 100 $cm^{-1}$ and $I_{132}$ denotes the Raman intensity at 132 $cm^{-1}$, and the $^{29}Si$ NMR spectra of the composition has its significant product signals in the chemical shift range from +23 ppm to −13 ppm, from −18 ppm to −33 ppm and from −73 ppm to −93 ppm, and wherein the polysilane is a complex substance mixture having an average molar mass of 300-900 g/mol, and wherein the average chain length of the composition corresponds to n=3-9.

2. The composition according to claim 1, wherein the polysilane mainly contains branched chains.

3. The composition according to claim 1 wherein the substituents consist of chlorine.

4. The composition according to claim 1 wherein the composition is oily to viscous.

5. The composition according to claim 1, wherein the composition has a yellow to orange or red-brown color.

6. The composition according to claim 1, wherein the chlorinated polysilane is readily soluble in inert solvents.

7. A process for preparing the composition comprising a halogenated polysilane according to claim 1, in which a halosilane is reacted with silicon at a temperature of over 700° C. to produce the halogenated polysilane, wherein the reaction is carried out with an excess of halosilane with respect to the dihalosilylene ($SiX_2$) formed.

8. The process according to claim 7, wherein the reaction is carried out at least in part in a packed bed of silicon and the retention time of the halosilane in a packed bed of the silicon used is adjusted to the grain size of the silicon.

9. The process according to claim 7, wherein the reaction is carried out in a pressure range from 0.1-1000 hPa.

10. The process according to claim 7, wherein the reactor parts on which the halogenated polysilane is to be deposited are kept at a temperature of −70° C. to 300° C.

11. The process according to claim 10, wherein the temperature is 20° C. to 280° C.

* * * * *